United States Patent [19]

Wisner

[11] Patent Number: 4,703,235
[45] Date of Patent: Oct. 27, 1987

[54] BRUSHLESS DC MOTOR

[75] Inventor: George R. Wisner, Deep River, Conn.

[73] Assignee: United Technologies Corporation, Hartford, Conn.

[21] Appl. No.: 938,481

[22] Filed: Dec. 3, 1986

[51] Int. Cl.[4] .............................................. H02K 29/12
[52] U.S. Cl. ..................................... 318/254; 318/138; 318/439
[58] Field of Search ......................... 318/138, 254, 439

[56] References Cited

U.S. PATENT DOCUMENTS 4,612,486  9/1986  Ban et al. ......................... 318/138 X

Primary Examiner—William M. Shoop, Jr.
Assistant Examiner—Bentsu Ro
Attorney, Agent, or Firm—Eric W. Petraske

[57] ABSTRACT

A brushless DC motor employs a set of coils positioned around the motor axis to respond to an aximuthal pattern of changing eddy current sensitivity. Rf voltage is frequency-multiplexed on the motor power leads at a frequency that does not affect motor operation. Rf voltage measurement circuits located remotely from the motor respond to the changing coil impedance to generate signals representing the azimuthal position of the motor rotor, that control a set of commutation circuits.

7 Claims, 4 Drawing Figures

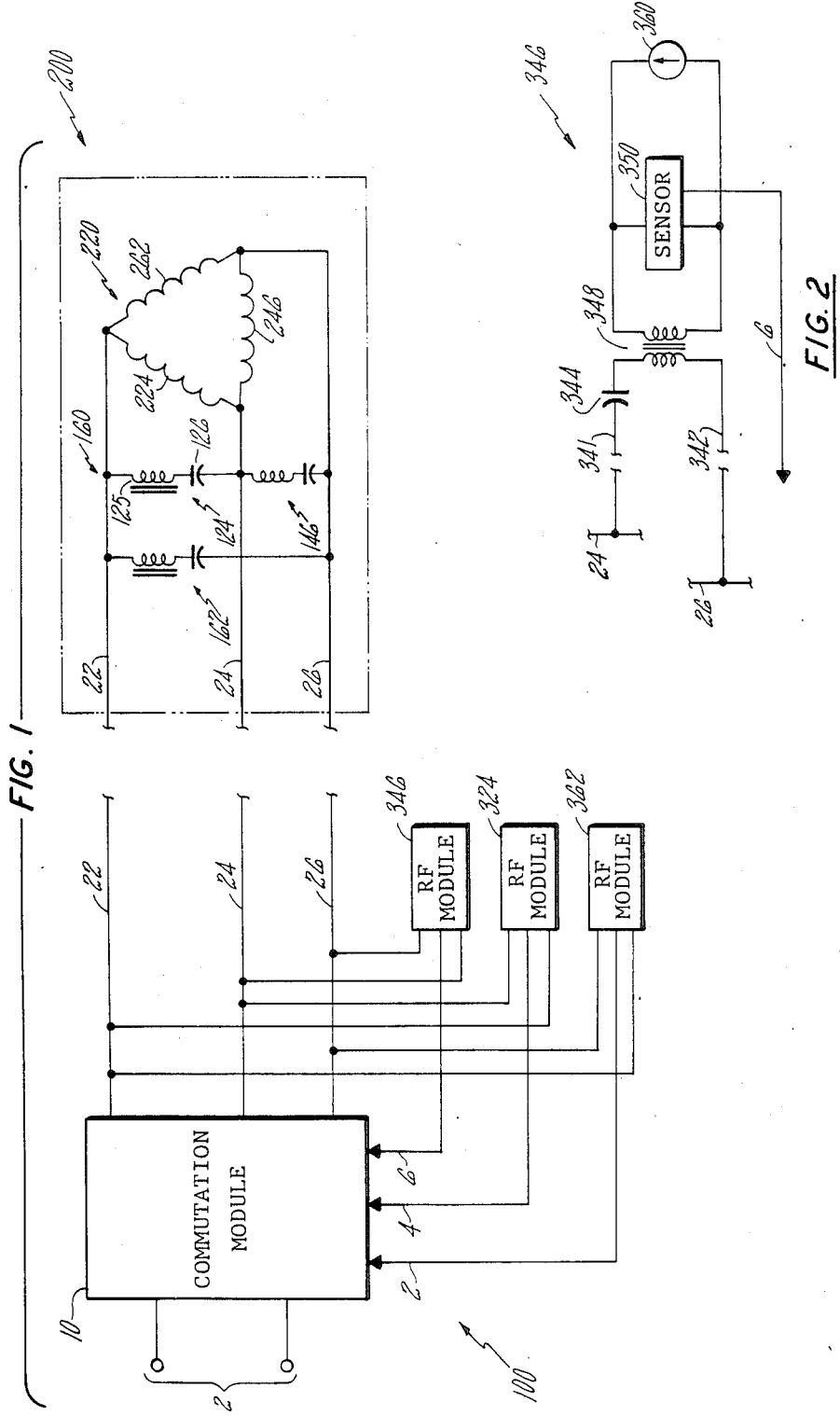

BRUSHLESS DC MOTOR

TECHNICAL FIELD

The field of the invention is that of brushless DC motors.

BACKGROUND ART

It is known in the art that commutation of a brushless DC motor requires sensing the position of the rotor of the motor or of the shaft of the motor. A switching circuit will apply DC voltage to one or another of the coils within the motor depending upon the position of the rotor. In order to start the motor effectively, the sensor should be able to measure the position of the rotor when it is stationary.

Presently used techniques employ either magnetic sensors, both Hall-Effect and magnetoresistive sensors, or optical sensors. Optical sensors are notoriously susceptible to dirt and sensors with sufficient resolution are relatively expensive. Hall-effect sensors have a history of reliability problems when operated in severe environments.

Rotor position techniques currently in use require active semiconductor devices for their operation, further reducing the reliability of the device.

DISCLOSURE OF INVENTION

The invention relates to a brushless DC motor employing a switch to energize the motor coils in response to signals generated by a passive sensor employing the change in impedance of an rf circuit that depends on the presence or absence of a plate of conductive material that generates eddy currents in response to an applied radio frequency field.

A feature of the invention is the generation of an rf current at a remote location by an inexpensive signal generator and the transmission of that signal to the motor, where the signal generates eddy currents in a piece of material that rotates together with the rotor. A pattern in the material being rotated, whether areas of different conductivity or areas of different distance from the probe, results in an impedance of the probe at the rf frequency that depends on the pattern and thus depends on the azimuth of the rotor.

A feature of the invention is the frequency multiplexing of the probe signal on the motor coil windings.

Another feature of the invention is the use of a passive sensing device.

Another feature of the invention is the ability of the sensing module to detect the rotor position when it is stationary.

Other features and advantages will be apparent from the specification and claims and from the accompanying drawings which illustrate an embodiment of the invention.

BRIEF DESCRIPTION OF DRAWINGS

FIG. 1 illustrates, in partially pictorial, partially schematic form, a DC motor constructed according to the invention.

FIG. 2 illustrates schematically a module within the circuit of FIG. 1.

BEST MODE OF CARRYING OUT THE INVENTION

Figure 4:
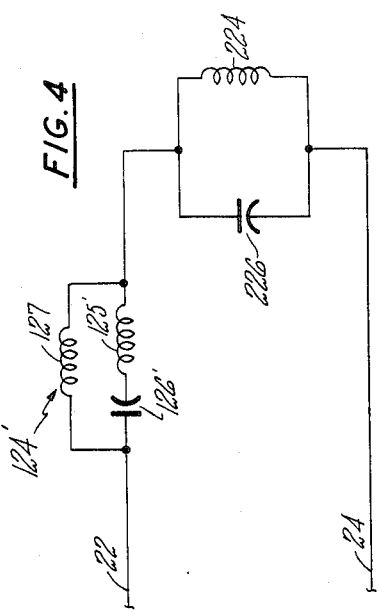
FIG. 4 illustrates, in partially pictorial, partially schematic form, an alternative probe arrangement.

Referring to FIG. 1, there is shown a schematic diagram of a motor constructed according to the invention. On the left, in region 100 there is shown an input pair of power leads 2 for carrying a DC voltage into module 10 labeled Commutation Module, which switches the DC power to one of three coils shown on the right hand side of the drawing. The switching will be performed in accordance with the signals traveling on lines 2, 4, and 6 from modules labeled 362, 324, and 346, respectively. These modules sense rf sensor voltages that are frequency - multiplexed on the three power leads 26, 24, and 22 that carry the DC voltage to the three coils.

On the right side of the drawing, there is shown a conventional representation of three coils of a DC motor 220 within a dotted line indicated by the numeral 200 that represents the boundary of the motor area and also represents a cover for the motor in cases where such a cover is present. The three coils are numbered 262, 246, and 224, in accordance with the numbering system used for the control modules and the power leads. It is not necessary for the practice of the invention that there be three coils and other conventional coil assignments may be used. In parallel with each coil, there is a corresponding eddy current probe unit schematically indicated respectively by the numerals 162, 146 and 124. Each of these probe units is a capacitively coupled probe coil connected in parallel with one of the coils of the motor. The separate eddy current circuit is a capacitor 126, illustratively having a capacitance of 120 pF in series with a coil labeled 124 illustratively having an inductance of 800 mH and wound on a pot core of ferrite having a core diameter of 1.5 mm.

In operation, rf signals of three separate frequencies will be applied to probes 146, 162, and 124 by connections from rf modules 346, 362, and 324 that are discussed below. The use of three different frequencies serves to decouple the signals from the probes. The frequencies are illustratively in the range of 300 kHz to 1 MHz. The design of the motor coils and the choice of rf frequencies is chosen so that the motor coils have a sufficiently high impedance at these rf values that they are effectively open circuits.

Figure 3:
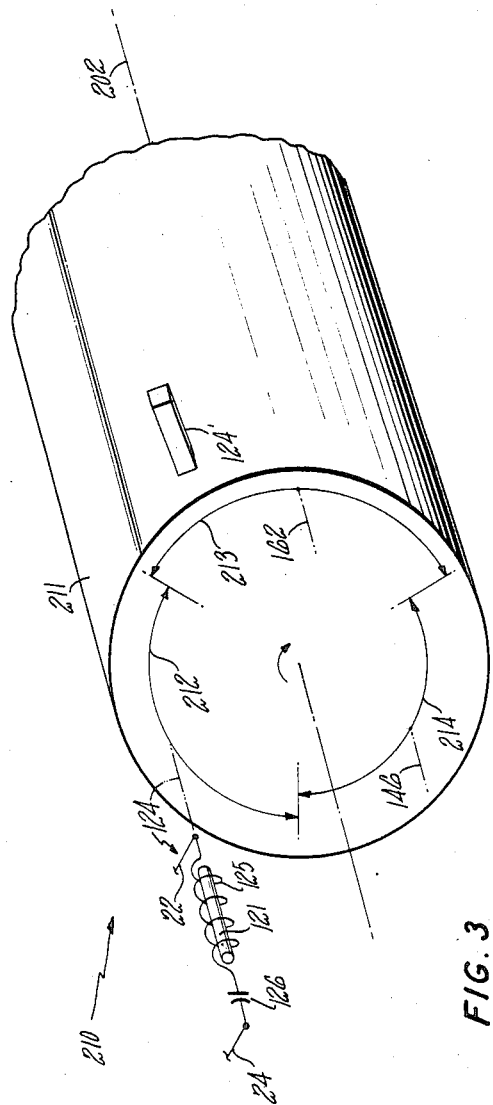
FIG. 3 illustrates, in partially pictorial, partially schematic form, a probe arrangement.

Referring now to FIG. 3, there is shown a cylindrical eddy current sensor disk 210 that is centered on shaft 202, the shaft of the motor. Disk 210 is rigidly fixed to the shaft and rotates with it so that the pattern to be described next indicates the azimuthal position of shaft 202.

On the front surface of disk 210, shown schematically by a series of three arrows, there are three areas labeled 212, 213, and 214, each covering one-third of the azimuth. These arrows represent regions of different "eddy-current sensitivity" within disk 210. For example, disk 210 may be made of copper and the arrows may represent slots machined into the copper. A coil placed close to the front surface of disk 210 as indicated by arrows 124, 146, and 162, and powered at the rf frequencies referred to in the discussion of FIG. 1, will induce eddy currents in the material of disk 210. The magnitude of the eddy currents and thus the impedance of such a coil will depend on the conductivity of the material near the coil and also on the distance of the material from the coil. In the case of a slot, the impedance difference as disk 210 rotates will be that between eddy currents being generated in close proximity to the end of the coil and those generated at a metal region that is relatively far removed from the coil (when the slot is next to the probe). This difference in eddy currents will translate to a difference in impedance that may be detected by sensing circuits located remotely from the motor in the rf modules referred to above.

To the left of FIG. 3, there is indicated schematically a sensing coil according to the invention comprising a rod or pot labeled 121 that is a relatively high permeability material about which coil 125 is wound. Capacitor 126 is included to prevent the DC voltage applied to the motor coils from passing through the eddy current probe. Leads from this assembly connect to two small lines labeled with the numerals 22 and 24 that represent power leads 22 and 24 respectively. This assembly has been shown displaced from disk 210 in order to show the schematic more clearly. In operation, the diameter of coil 125 will be illustratively 1.5 mm and the gap between the end of coil 125 and disk 210 will be illustratively 0.5 mm. With this gap, a spatial resolution along an azimuthal direction will be approximately the magnitude of the air gap, also 0.5 mm. It is a requirement of this embodiment of the invention that displacement of disk 210 and thus of shaft 202 along the direction of shaft 202 be controlled to be a fraction of the air gap, so that a clear separation is maintained between the two values of impedance associated with the presence or absence of the slot.

Those skilled in the art will readily recognize that other patterns of material may be used. In particular, an insert of a material having a different conductivity may be used instead of a slot. Alternatively, a set of steps projecting a certain dimension along the direction of shaft 202 that is comparable to the air gap may be used to provide two different values of coil impedance. The term "eddy current sensitivity" is used herein to refer to the effect of different materials and geometries on the impedance of coil 125. Also, a set of patterns may be used on surface 211 of disk 210. That is, disk 210 may extend a substantial amount along the direction of shaft 202 and the eddy current probes may be oriented radially as shown by the box labeled 124'. This embodiment has the advantage that it is less susceptable to movement along the direction of axis 202.

Referring now to FIG. 2, there is shown an embodiment of the rf module 346. Within this module, an rf current source 360, such as an operational amplifier with current sense generates a reasonable approximation of a current source at the desired rf frequency. Sensor circuit 350 such as an amplitude modulator envelope detector is connected across current source 360 and produces a signal on line 6 when the value of the voltage across sensor 350 crosses some predetermined threshold. Transformer 348 is a conventional tuned transformer that couples energy efficiently at the frequency of source 360. Capacitor 344 is an isolation capacitor. The capacitor and transformer together serve to tune the coupling of energy in a relatively narrow band about the frequency of current source 360 to isolate it from both the DC applied power on the power leads and also from the rf energy generated by modules 324 and 362. Lines labeled with the numerals 24 and 26 on the left of the diagram indicate the power leads having those numbers. This module will apply a voltage along leads 24 and 26 and sensor 350 within the module will respond to a change in the impedance of eddy current probe 146 as rotor disk 210 passes beneath it. The signal on line 6 will illustratively be binary, such as a logic one when slot 214 of rotor disk 210 is close to eddy current probe 146 and a logic zero otherwise. Conventional circuits within commutation module 10 will respond to the three signals along lines 2, 4, and 6 and to apply DC voltage to the correct coil or coils of motor 200.

In a particular embodiment of the invention, motor 200 is in a hermetic container that is used in a refrigeration compressor. In that case, the use of frequency multiplexing for the sensor signals represents a substantial advantage in maintaining the required hermetic seal because only the power leads need to pass through the motor cover and only comparatively rugged electrical components are exposed to the freon/oil environment.

Those skilled in the art will readily appreciate that a number of alternate coding patterns may be used and that a number of different sensor circuits, such as a circuit responding to a pulse that is generated when the leading edge of one of slots 212, 214, or 213 passes beneath the probe may also be used.

In order to exploit the ability of this invention to indicate the azimuthal orientation of the rotor when the motor is first turned on, it may be advantageous to build a conventional delay circuit into module 10, so that the rf generators and the sensor circuits within the rf modules 346, 324, and 362 stabilize and produce a stable set of output signals on lines 2, 4, and 6 before power is first applied to the motor leads. The stabilizing time is not critical, since the rf period is much smaller than switching periods for motors. Those skilled in the art will readily be able to pick convenient parameters for particular applications.

Conventional logic circuitry within commutation module 10 may also be applied to scrutinize all three signals simultaneously and to apply power only in a permitted state to one coil at a time.

Those skilled in the art will readily recognize that the invention may be implemented with only two eddy current probes and only two rf modules, using a different pattern on disk 210 to represent the azimuthal position. For example, in the case of three coils on the motor and two eddy current probes, a straightforward pattern is a slot 212 that covers two-thirds of the azimuth and a second slot 213 that also covers two-thirds of the azimuth, the two slots being displaced by one-third of the azimuth. In that case, one of the one-third areas will be indicated by the presence of a single signal on one of the probes, the second one-third will be indicated by the presence of a signal on the other probe and the remaining third will be indicated by the presence of a signal on both probes.

A series-connected embodiment of the invention is illustrated in FIG. 4, in which probe circuit 124', generally similar to probe circuit 124, performs the function of sensing the rotor plate. A low-frequency path for the coil current is along lead 22, through rf choke 127, through motor coil winding 224 and returning on lead 24. The rf path travels through capacitor 126' and probe coil 125', then bypasses the motor coil through capacitor 226. Probe coil 125' will be wrapped around a core positioned similarly to the embodiment of FIG. 3.

It should be understood that the invention is not limited to the particular embodiments shown and described herein, but that various changes and modifications may be made without departing from the spirit and scope of this novel concept as defined by the following claims.

I claim:

1. A brushless DC motor system comprising:

a DC motor having a rotor and at least two coil windings connected to corresponding coil winding terminals;

commutation means for supplying DC current to said coil winding terminals in response to applied position signals;

an eddy current sensing member attached to said rotor and has an azimuthal pattern of eddy current material having at least two predetermined values of eddy current sensitivity;

a rotor position detector comprises at least one radio frequency current generating means for generating radio frequency electric current at at least one predetermined sensing frequency and radio frequency voltage sensing means, connected to said current generating means, for generating said position signals representative of said rotor position, both of said current generating means and said radio frequency voltage sensing means being located remote from said motor, and said rotor position detector further comprises at least two eddy current probes, each is connected to a corresponding one of said at least two coil windings and being located in close proximity to said eddy current sensing member, said eddy current probe being connected to said current generating means and to said radio frequency voltage sensing means, so that said radio frequency voltage sensing means responds to a radio frequency voltage on said eddy current probe, having at least two probe voltage values dependent on which of said at least two predetermined values of eddy current sensitivity of said eddy current sensing member is present in relation to said eddy current probe, whereby said position signals generated by said radio frequency voltage sensing means represents said rotor position;

said radio frequency current generating means also connected to a common electrical path between said commutation means and said coil winding terminals, whereby said DC current and said radio frequency current travel along a common conductor.

2. A system according to claim 1, further characterized in that:

each of said at least two eddy current probes is connected in parallel with a corresponding one of said at least two coil windings, each said coil winding is substantially an open circuit at said radio frequency.

3. A system acording to claim 2, further characterized in that:

said at least one radio frequency current generating means comprises means for generating radio frequency current at two sensing frequencies and each of said at least two eddy current probes has a variable impedance at one sensing frequency and a high impedance at other sensing frequency.

4. A system according to claim 1, further characterized in that:

each of said at least two eddy current probes is connected in series with a corresponding one of said at least two coil windings and said eddy current probe has a first path therethrough that has a low DC impedance and a high impedance at said radio frequency and a second path therethrough that has a high DC impedance and an azimuthally dependent impedance at said radio frequency.

5. A system acording to claim 4, further characterized in that:

said at least one radio frequency current generating means comprises means for generating radio frequency current at at least two sensing frequencies and each of said at least two eddy current probes has a variable impedance at one sensing frequency and a high impedance at other sensing frequency.

6. A system according to claim 1, further characterized in that;

said commutation means includes delay means for delaying the initial application of DC current to said coil winding terminals until said position signals generated by said radio frequency voltage sensing means has stabilized, whereby said motor is turned on with said DC current supplied correctly to said coil windings.

7. A system according to claim 1, further characterized in that said DC motor is enclosed within a protective cover containing said at least two eddy current probes and said eddy current sensing member;

said commutation means, said radio frequency current generating means and said radio frequency voltage sensing means are all located outside said protective cover; and said common electrical path comprises at least two electrical leads for carrying both said DC current and said radio frequency current.

* * * * *